United States Patent Office 3,586,643
Patented June 22, 1971

3,586,643
FLUORINE CONTAINING POLY-N-VINYL CARBOXYLIC ACID AMIDES, PROCESSES FOR THEIR PREPARATION AND THEIR USE AS TEXTILE FINISHING AGENTS
Helmut Hahn, Burghausen, Salzach, Klaus-Dieter Müller, Kelkheim, Taunus, Siegfried Rebsdat, Altotting, and Erich Schuierer, Burghausen, Salzach, Germany, assignors to Farbwerke Hoechst Aktiengesellschaft vormals Meister Lucius & Bruning, Frankfurt am Main, Germany
No Drawing. Filed June 25, 1969, Ser. No. 836,664
Claims priority, application Germany, July 4, 1968, P 17 70 795.8; Oct. 17, 1968, P 18 03 581.9
Int. Cl. C08g 33/02
U.S. Cl. 260—2                                19 Claims

ABSTRACT OF THE DISCLOSURE

Polymers containing recurring units of the formula $$\left[\begin{array}{c} -CH-CH_2- \\ | \\ NH-CO-CXY-R_f \end{array}\right]$$

in which $R_f$ is perfluoroalkyl of 3 to 10 carbon atoms, and X and Y are fluorine and/or hydrogen, are useful as agents for rendering fibrous materials water and oil repellent. The lower oligomers are soluble in low volatile fluorinated hydrocarbons. The polymers are soluble in acetone and capable of forming aqueous dispersions.

---

The present invention concerns fluorine containing poly-N-vinyl carboxylic acid amides, especially polymers having a skeletal chain containing recurring units of the formula $$\left[\begin{array}{c} -CH-CH_2- \\ | \\ NH \\ | \\ CO \\ | \\ CXY \\ | \\ R_f \end{array}\right]_n \quad (I)$$

wherein $R_f$ is perfluoroalkyl of 3 to 10 carbon atoms, the number of carbon atoms being variable within the chain and X and Y are selected from the group consisting of fluorine and hydrogen.

Further objects of this invention are the lower oligomers of this species, being soluble in low volatile fluorinated hydrocarbons, and mixed polymers containing co-monomers free of fluorine.

Further objects of this invention are processes for the preparation of said polymers, oligomers and mixed polymers.

Still a further object of this invention is the use of the new polymers as agents rendering fibrous materials water and oil repellent.

Further objects of this invention will appear from the following disclosure.

It is already known to convert $\Delta^2$-oxazolines having the Formula II $$\begin{array}{c} H_2C\!\!-\!\!\!-\!\!\!-N \\ | \quad\quad \| \\ H_2C \quad C-R \\ \diagdown \diagup \\ O \end{array} \quad (II)$$

wherein R is an aliphatic, cycloaliphatic or aromatic radical by means of Lewis' acids, for example sulfuric acid or boron tri-fluoride, into high-molecular weight polymers containing units of N-acyl-, ethylene-imine of the Formula III $$\left[\begin{array}{c} -N-CH_2-CH_2- \\ | \\ R-C=O \end{array}\right]_x \quad (III)$$

in which R is defined as above (cf. W. Seeliger et al., Angew. Chem. 78, 919 (1966), Deutsche Auslegeschrift 1,206,585).

In agreement with this reaction mechanism the infrared spectrum of the polymer only reveals $CH_2$ absorptions at 1321, 1363, 1436 and 1460 cm.$^{-1}$ (cf. Polymer Letters 5, 878 (1967)).

Analogous N-acyl-polyamines corresponding to Formula III wherein, however, R stands for a perfluorinated alkyl radical have been described in U.S. patent specification No. 3,198,754 which discloses that they are obtainable by polymerization of aziridines corresponding to Formula IV.

$$\begin{array}{c} \quad\quad CH_2 \\ \quad\quad \diagup | \\ R-CO-N \\ \quad\quad \diagdown | \\ \quad\quad CH_2 \end{array} \quad (IV)$$

From French patent specification No. 1,450,751 it is known to polymerize oxazolines of the Formula V $$\begin{array}{c} H_2C\!\!-\!\!\!-\!\!\!-N \\ | \quad\quad \| \\ H_2C \quad C-(CX'_2)_m-CF_3 \\ \diagdown \diagup \\ O \end{array} \quad (V)$$

forming polymers of the Formula VI $$\left[\begin{array}{c} -N-CH_2-CH_2- \\ | \\ C=O \\ | \\ (CX'_2)_m-CF_3 \end{array}\right]_x \quad (VI)$$

wherein $X'$ is fluorine, chlorine and hydrogen and $m$ is an integer from 0 to 15.

Moreover, there has been disclosed the conversion of fluorine containing 2-alkyl-$\Delta^2$-oxazolines of the Formula VII by means of thermic treatment at 60–135° C. to fluorine containing N-vinyl-carboxylic acid amides having the Formula VIII $$\begin{array}{ccc} H_2C\!\!-\!\!\!-\!\!\!-N & & HN-CH=CH_2 \\ | \quad\quad \| & \longrightarrow & | \\ H_2C \quad C-R'_f & & CO \\ \diagdown \diagup & & | \\ O & & R'_f \\ (VII) & & (VIII) \end{array}$$

(cf. H. C. Brown and Ch. R. Wetzel, J. Org. Chem. 30, 3729–3733 (1965)) which is recognized in infrared spectroscopy by the decrease of the (C=N)-peak and the increase of the (C=O)— and the NH-peaks.

It has now been found that fluorine containing poly-N-vinyl-carboxylic acid amides of the Formula I $$\left[\begin{array}{c} -CH-CH_2- \\ | \\ NH \\ | \\ C=O \\ | \\ CXY \\ | \\ R_f \end{array}\right]_n \quad (I)$$

wherein X and Y are selected from the group consisting of fluorine and hydrogen, $R_f$ is a perfluorinated alkyl radical of 3 to 10 carbon atoms and $n$ is an integer of 2 to 10 can be prepared by treating $n$ mols of a fluorine containing 2-alkyl-$\Delta^2$-oxazoline of the Formula IX $$\begin{array}{c} H_2C\!\!-\!\!\!-\!\!\!-N \\ | \quad\quad \| \\ H_2C \quad C-CXY-R_f \\ \diagdown \diagup \\ O \end{array} \quad (IX)$$

in which X, Y and $R_f$ have the meanings given above, at about 30° to about 150° C. with a peroxo acid, preferably Caro's acid (peroxo-monosulfuric acid).

Also there the structure is demonstratable by infrared spectroscopy which indicates strong infrared NH absorptions at about 3360 and 1550 cm.$^{-1}$ and CO-peaks of as high an intensity at about 1790 cm.$^{-1}$.

This reaction is surprising insofar as it has not been possible, previously, to polymerize $\Delta^2$-oxazolines (having, for example, the Formula II) with peroxides (cf. Angew. Chem. 78, 919 (1966)).

By changing the polymerization conditions, especially the temperature and the amount of catalyst the degree of polymerization $n$ can be varied within the range from 5 to about 200, preferably 10 to 100. In the latter range oil-repelling values of from 110 to 120 can be reached (see below). The so-obtained poly-N-vinyl-carboxylic acid amides whenever applied in solution or dispersion have proved to be excellent agents for rendering textiles oil and water repellent. It has been ascertained that such properties are brought about essentially by a certain length of chain of the perfluorinated alkyl groups (i.e. $C_3F_7$ up to $C_{10}F_{21}$).

In solutions all of these products are capable of imparting to textiles oil and water repelling properties. Though excellently soluble, for example, in acetone, these polymers which have a medium molecular weight higher than 1850 are only very sparingly dissolved in volatile fluorinated hydrocarbons. Therefore, a direct application of the above-identified poly-N-vinyl-carboxylic acid amides by spraying them into textiles with the aid of fluorinated chlorohydrocarbons using, for example, spray devices is not realizable in an economically advantageous way with polymers having an average polymerization degree defined by $n=5$ to 200.

It has now been found that poly-N-vinyl-carboxylic acid amides that are also perfectly soluble in volatile fluorinated chlorohydrocarbons and hence suited for spraying with such solvents are obtained by setting up a polymerization degree defined by $n=2$ to less than 5 which corresponds to a molecular weight in the range from 750 to 1850. Surprisingly, this is achieved when the aforesaid polymerization of the fluorine containing 2-alkyl-$\Delta^2$-oxazolines or mixtures thereof with the corresponding fluorine-free oxazolines proceeds in the presence of peroxo acids, preferably Caro's acid, in such a way that the monomers are quickly heated to 100° C. and the reaction is carried out between 100 and 150° C., preferably 140° C.

From the following table it may be seen that the performance of the reaction (of 0.1 mol of 2-(1'-H-perfluorohexyl)-$\Delta^2$-oxazoline and 0.001 mol of Caro's acid) at an elevated temperature enables to obtain for the products of the invention a lower molar weight and an excellent solubility of the oligomers in fluorinated chloro-hydrocarbons, for example in 1,1,2-trifluoro-1,2,2-trichloroethane.

| Final reaction temperature, ° C. | Molar weight | Solubility in 1,1,2-trifluoro-1,2,2-trichloroethane |
|---|---|---|
| 130 | 1,300–1,400 | Readily soluble. |
| 150 | 1,250 | Do. |
| 130 | 1,600 | Do. |
| 100 | 1,800 | Soluble. |
| 95 | 3,000 | Only partly soluble. |
| 95 | 3,500–4,000 | Sparingly soluble. |

It has been found, furthermore, that N-vinyl-carboxylic acid amides having the formula X (obtainable by thermic treatment of oxazolines of the Formula IX)

$$\begin{array}{c} HN\text{---}CH=CH_2 \\ | \\ CO \\ | \\ CXY \\ | \\ R_f \end{array} \quad (X)$$

wherein X, Y and $R_f$ have the meanings given above, can be transformed into fluorine containing poly-N-vinyl-carboxylic acid amides of the Formula I by treating them with peroxidic catalysts, preferably di-tert.-butyl-peroxide at temperatures between about 25° C. and 200° C. Thereby, generally, products having a polymerization degree $n$ from 5 to about 200 are obtained.

A special mode of carrying out the process of the invention consists in preparing mixed polymers from fluorine containing 2-alkyl-$\Delta^2$-oxazolines having a different length of chain and fluorine-free 2-alkyl-$\Delta^2$-oxazolines. Surprisingly, it has been found that the ratio of the fluorine-free oxazoline component may vary between 10 and 90 molar percent without the hydrophobic or oleophobic property being substantially attenuated. This must be considered an important advantage of the mixed polymers, for owing to their lower contents of fluorine they have an inferior cost price.

The polymerization of the invention and the water and oil repellent properties of the products obtained are illustrated by the following examples which, however, are not intended to limit the invention thereto.

Example 1.—Production of a low-molecular weight polymer 27 g. (0.1 mol) of 2-(1'-H-perfluorohexyl)-$\Delta^2$-oxazoline were quickly heated with 0.11 g. (1 mmol) of Caro's acid to 100° C. under an atmosphere of inert gas raising the temperature within four hours to 150° C. A polymer having a molecular weight of 1250 (osmometric test) perfectly soluble in 1,1,2-trifluoro-1,2,2-trichloroethane was obtained.

Example 2.—Production of the polymer in two steps 33 g. (90 mmols) of 2-(1'-H-perfluorohexyl)-$\Delta^2$-oxazoline were freed in high vacuum from traces of oxygen and heated for five hours to 130–135° C. under pure nitrogen. A viscous, yellowish liquid formed which was subsequently heated with 0.078 g. (0.535 mmol) of di-tert.-butyl-peroxide to 130° C. for 13 hours. A yellowish solid transparent mass was obtained. As the following table reveals the solution of the polymer in acetone imparts to textiles excellent oil and water repelling properties.

| Concentration | Oil-repelling effect [1] | Water-repelling effect |
|---|---|---|
| 1% by weight | 120 | ([1]) |
| 0.8% by weight | 110 | ([1]) |

[1] The degree of oleophoby has been asessed according to U.S. Pat. specification 3,362,782 using mixtures of n-heptane and paraffin oil.

| Oleophobic value | Percentage by volume of— | |
|---|---|---|
|  | n-Heptane | Paraffin oil |
| 50 | 0 | 100 |
| 60 | 10 | 90 |
| 70 | 20 | 80 |
| 80 | 30 | 70 |
| 90 | 40 | 60 |
| 100 | 50 | 50 |
| 110 | 60 | 40 |
| 120 | 70 | 30 |

Example 3.—Production of the polymer in a single step 25 g. (67.5 mmols) of 2-(1'-H-perfluorohexyl)-$\Delta^2$-oxazoline were heated with 0.077 g. (0.675 mmol) of Caro's acid for four hours to 90–100° C. under an atmosphere of nitrogen. There formed a yellowish and transparent mass.

The solution of the so-obtained polymer in acetone imparted to textiles outstanding oil and water repelling properties as may be seen from the following table.

| Concentration of the polymer in acetone, percent by weight: | Oil-repelling |
|---|---|
| 5 | 120 |
| 3 | 120 |
| 1 | 120 |
| 0.8 | 110 |
| 0.5 | 100 |

Also the hydrophobic effect was unobjectionably positive. With dispersions in water of the polymer prepared according to the above examples using, for example, sodium perfluoro-octanate as emulsifier the same effect was obtained as with solutions in acetone.

Example 4.—Preparation of the polymer in a single step 30 g. (81 mmols) of 2-perfluorohexyl-$\Delta^2$-oxazoline were heated with 0.050 g. (0.44 mmol) of Caro's acid for eight hours to 90–100° C. under $N_2$. The oleophoby of a 1% solution in acetone of the formed polymer was 120 (assessment as per Example 2).

Example 5.—Production of a mixed polymer in a single step 2.14 g. (12.5 mmols) of 2-(1'-H-perfluoroethyl)-$\Delta^2$-oxazoline and 18.5 g. (50 mmols) of 2-(1'-H-perfluorohexyl)-$\Delta^2$-oxazoline were heated with 0.050 g. (0.44 mmol) of Caro's acid for 4 hours to 90–100° C. under an atmosphere of nitrogen. The formed polymer was excellently soluble in acetone. The solution in acetone and aqueous dispersion proved to be excellent hydrophobic and oleophobic agents.

Example 6.—Production of a mixed polymer from fluorine containing and fluorine-free $\Delta^2$-oxazolines 18.5 g. (50 mmols) of 2-(1'-H-perfluorohexyl)-$\Delta^2$-oxazoline and 4.9 g. (50 mmols) of 2-ethyl-$\Delta^2$-oxaboline were heated for eight hours to 90–100° C. with 0.04 g. (0.35 mmol) of Caro's acid under nitrogen. The obtained polymer dissolved readily in acetone and was an excellent hydrophobic and oleophobic agent. The oleophobic effects amounted to 110.

We claim:
1. A polymer having a skeletal chain containing recurring units of the formula

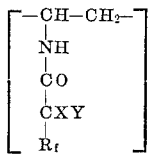

wherein $R_f$ is perfluoroalkyl of 3 to 10 carbon atoms, the number of carbon atoms being variable within the chain, and X and Y are selected from the group consisting of fluorine and hydrogen.

2. A polymer of the formula

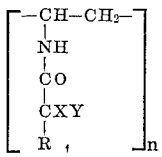

wherein $R_f$ is perfluoroalkyl of 3 to 10 carbon atoms, the number of carbon atoms being variable within the chain, X and Y are selected from the group consisting of fluorine and hydrogen, and $n$ is a number from 2 to about 200.

3. The polymer as claimed in claim 2, wherein $n$ is a number from 2 to less than 5.

4. The polymer as claimed in claim 2, wherein $n$ is a number from 5 to about 200.

5. A mixed polymer having a skeletal chain containing recurring units of the formulae

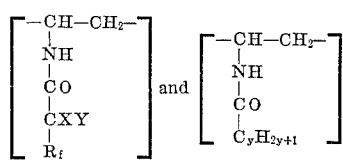

wherein $R_f$ is perfluoralkyl of 3 to 10 carbon atoms, the number of carbon atoms being variable within the chain, X and Y are selected from the group consisting of fluorine and hydrogen, and $y$ is an integer of 4 to 11, which is variable within the chain.

6. A polymer as claimed in claim 5, wherein the ratio of the fluorinated to the fluorine-free units is 9:1 to 1:9.

7. A polymer as claimed in claim 5, wherein the sum of the recurring units is from about 30 to 200.

8. A process for the preparation of a polymer of the formula

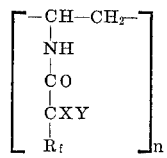

in which $R_f$ is perfluoroalkyl of 3 to 10 carbon atoms, the number of carbon atoms being variable within the chain, X and Y are selected from the group consisting of fluorine and hydrogen, and $n$ is a number from 2 to about 200, which comprises treating $n$ mols of a 2-alkyl-$\Delta^2$-oxazoline of the formula

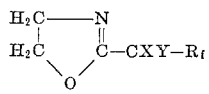

in which $R_f$, X and Y have the meanings given above, at a temperature of about 30 to about 150° C. in the presence of a peroxo acid.

9. The process as claimed in claim 8, wherein the peroxo acid is peroxo-mono-sulfuric acid.

10. The process for the preparation of polymers of the formula

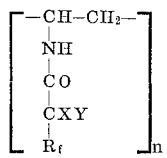

wherein $R_f$ is perfluoroalkyl of 3 to 10 carbon atoms, the number of carbon atoms being variable within the chain, X and Y are selected from the group consisting of fluorine and hydrogen, and $n$ is a number from 2 to less than 5, which comprises treating $n$ mols of a 2-alkyl-$\Delta^2$-oxazoline of the formula

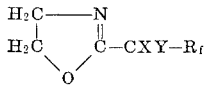

in which X, Y and $R_f$ have the meanings given above, at a temperature of about 100 to about 150° C. in the presence of a peroxo acid.

11. The process for the preparation of polymers of the formula

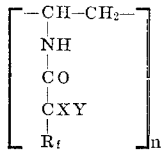

wherein $R_f$ is perfluoroalkyl of 3 to 10 carbon atoms, the number of carbon atoms being variable within the chain, X and Y are selected from the group consisting of fluorine and hydrogen, and $n$ is a number from 5 to about 200, which comprises treating $n$ mols of a 2-alkyl-$\Delta^2$-oxazoline of the formula

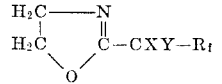

in which X, Y and $R_f$ have the meanings given above, at a temperature of about 30 to about 140° C. in the presence of a peroxo acid.

12. A process for the preparation of mixed polymers having a skeletal chain containing recurring units of the formulae

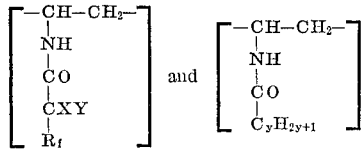

wherein $R_f$ is perfluoroalkyl of 3 to 10 carbon atoms, the number of carbon atoms being variable within the chain, X and Y are selected from the group consisting of fluorine and hydrogen, and y is an integer of 4 to 11, which is variable within the chain, which comprises reacting a mixture of an oxazoline of the formula

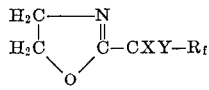

in which X, Y and $R_f$ have the meanings given above, and of an oxazoline of the formula

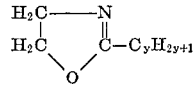

in which y has the meaning given above, in a molar ratio of 9:1 to 1:9 at a temperature of about 30 to about 150° C. in the presence of a peroxo acid.

13. A process for rendering fibrous materials water and oil repellent, which comprises contacting the fibrous material with a polymer having a skeletal chain containing recurring units of the formula

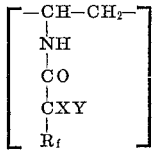

in which $R_f$ is perfluoroalkyl of 3 to 10 carbon atoms, the number of carbon atoms being variable within the chain, and X and Y are selected from the group consisting of fluorine and hydrogen.

14. The process as claimed in claim 13, wherein the polymer has the formula

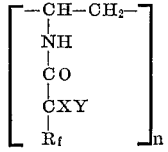

in which $R_f$ is perfluoroalkyl of 3 to 10 carbon atoms, the number of carbon atoms being variable within the chain, X and Y are selected from the group consisting of fluorine and hydrogen, and n is a number of 2 to about 200.

15. The process as claimed in claim 13, wherein the polymer has a skeletal chain containing recurring units of the formulae

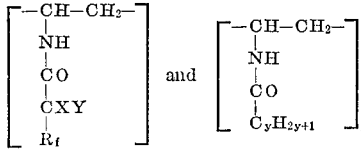

in which $R_f$ is perfluoroalkyl of 3 to 10 carbon atoms, the number of carbon atoms being variable within the chain, X and Y are selected from the group consisting of fluorine and hydrogen, and y is an integer of 4 to 11, which is variable within the chain.

16. The process as claimed in claim 13, wherein the polymer is used in an aqueous dispersion.

17. The process as claimed in claim 13, wherein the polymer is dissolved in an organic solvent.

18. The process as claimed in claim 13, wherein a polymer of the formula

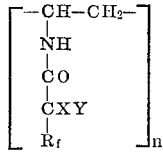

in which $R_f$ is perfluoroalkyl of 3 to 10 carbon atoms, the number of carbon atoms being variable within the chain, X and Y are selected from the group consisting of fluorine and hydrogen, and n is a number of 2 to less than 5, dissolved in a fluorinated low hydrocarbon, is used.

19. The process as claimed in claim 18, wherein the solvent is likewise the propellant for spraying the solution of the polymer onto the fibrous material.

References Cited

UNITED STATES PATENTS

| | | | |
|---|---|---|---|
| 2,706,727 | 4/1955 | Coover et al. | 260—89.7 |
| 3,198,754 | 8/1965 | Ahlbrecht et al. | 260—2 |
| 3,238,204 | 3/1966 | Hauptschein et al. | 260—247.7 |
| 3,316,224 | 4/1967 | Bestian et al. | 260—89.7 |
| 3,483,141 | 12/1969 | Litt et al. | 260—2 |

OTHER REFERENCES

Brown et al.: "Jour. Organic Chemistry," vol. 30 (1965), pp. 3729–3733.

SAMUEL H. BLECH, Primary Examiner

U.S. Cl. X.R.

117—135.5; 260—29.2, 29.6, 32.8, 33.8, 89.7, 307, 561